July 11, 1950  W. H. WANNAMAKER, JR  2,514,918
ELECTRONIC CONTROL AND INDICATION APPARATUS
Filed June 22, 1944  6 Sheets-Sheet 1

INVENTOR.
WILLIAM H. WANNAMAKER JR.
BY
C. B. Spangenberg
ATTORNEY.

FIG. 4

INVENTOR.
WILLIAM H. WANNAMAKER JR
ATTORNEY.

July 11, 1950    W. H. WANNAMAKER, JR    2,514,918
ELECTRONIC CONTROL AND INDICATION APPARATUS
Filed June 22, 1944    6 Sheets-Sheet 3

*INVENTOR.*
WILLIAM H. WANNAMAKER JR.
BY
*C. B. Spangenberg*
ATTORNEY July 11, 1950 W. H. WANNAMAKER, JR 2,514,918
ELECTRONIC CONTROL AND INDICATION APPARATUS
Filed June 22, 1944 6 Sheets-Sheet 4

*INVENTOR.*
WILLIAM H. WANNAMAKER JR.
BY
*ED Hangenberg*
ATTORNEY.

July 11, 1950　　W. H. WANNAMAKER, JR　　2,514,918
ELECTRONIC CONTROL AND INDICATION APPARATUS
Filed June 22, 1944　　　　　　　　　　　　　　6 Sheets-Sheet 6

INVENTOR.
WILLIAM H. WANNAMAKER JR.
BY
*C. B. Spangenberg*
ATTORNEY.

Patented July 11, 1950

2,514,918

UNITED STATES PATENT OFFICE 2,514,918

ELECTRONIC CONTROL AND INDICATION APPARATUS

William H. Wannamaker, Jr., Flourtown, Pa., assignor, by mesne assignments, to Minneapolis-Honeywell Regulator Company, Minneapolis, Minn., a corporation of Delaware Application June 22, 1944, Serial No. 541,576

6 Claims. (Cl. 318—28)

The general object of the present invention is to provide improved control apparatus characterized by the simple and effective manner in which two electronic valves are combined for full wave utilization of alternating current supplying the energy required to effect control operations.

A specific object of the invention, is to combine a diode valve, a control grid valve, a condenser, a control device and a source of alternating current in such manner that currents flowing in one direction through said device and condenser, flow through said diode and are regulated by the potential of said condenser, and the currents flowing in the opposite direction, flow through said grid valve, and are regulated by the grid potential of the grid valve, and regulate the potential of the condenser.

A more specific object of the invention is to so combine two electronic valves, one a diode and the second including a control grid, with a control device, and with a controlling element associated with said grid, that in effecting control actions initiated by the controlling element, the control device is actuated by energizing current alternately supplied by the diode and the grid valve in successive halves of the oscillation cycles of the alternating current by which the control apparatus is energized. Advantageously, said second electronic valve is of the beam power type including a screen grid as well as a control grid, and both valves are advantageously enclosed in the same envelope and form parts of a duplex electronic tube. The said controlling element may be responsive to changes in the value of any control quantity or condition such as temperature, pressure, velocity or weight, adapted to give movement to the controlling element on a small change in the value of said quantity or condition. The controlling device may be an electro-magnetic valve or switch, a rotatable motor, or other relay means, or it may consist of one or more signal lamps.

A still more specific object of the invention is to provide a control system comprising a diode valve and multi-grid and control grid valve as described, and also comprising means for causing the control grid valve to operate as an oscillator, or without oscillation, depending on the action of the controlling element, and in which the control device is actuated or adjusted in a manner depending on whether the last mentioned valve is or is not oscillating.

Another specific object of the invention is to provide a control system of the general character hereinbefore described in which the control element is a flame and in which the control device is operated to produce different control or signal effects accordingly as a flame having predetermined characteristics is or is not maintained.

The control device included in my improved control system may take various forms. For example, it may be an electro-magnetic valve or switch, or an electric motor which may be either reversibly or unidirectionally rotatable, or it may comprise one or more signal lamps.

The various features of novelty which characterize my invention are pointed out with particularity in the claims annexed to and forming a part of this specification. For a better understanding of the invention, however, its advantages, and specific objects attained by its use, reference should be had to the accompanying drawing and descriptive matter in which I have illustrated and described preferred embodiments of the invention.

Figure 1:
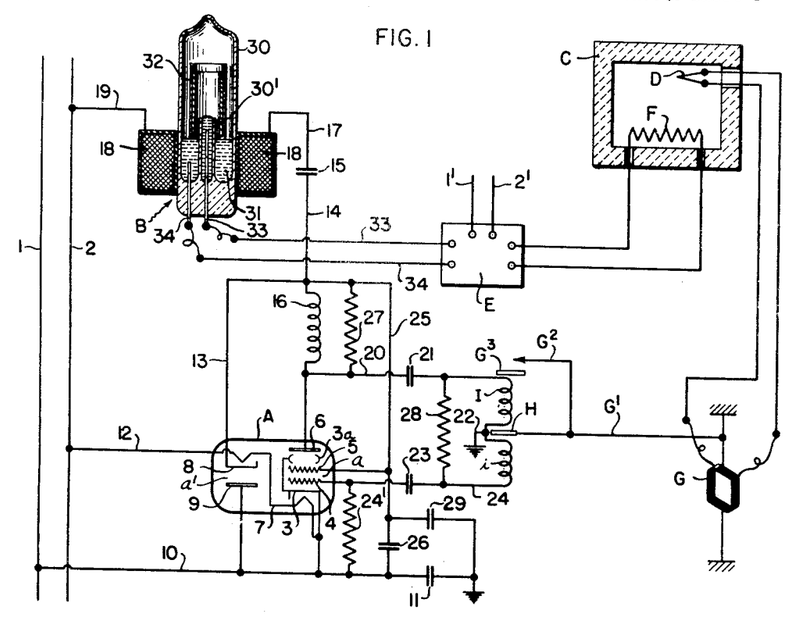
Fig. 1 is a diagrammatic representation of a control system.

In Fig. 1, I have diagrammatically illustrated a control system embodiment of my present invention energized by alternating current supply conductors 1 and 2 in which a diode-tetrode tube A is employed to actuate a control device B in accordance with the temperature in a furnace C to which a thermocouple D is responsive. In response to variations in the temperature of the thermocouple D, the control device B adjusts a regulator E to vary the supply of heat to the furnace C. As diagrammatically shown in Fig. 1, the furnace C is heated by an electric heating resistor F and the regulator E operates to connect the resistor F to or disconnect it from heating current supply conductors 1' and 2' accordingly as the temperature of the thermocouple D is less than or exceeds a predetermined temperature. As diagrammatically shown in Fig. 1, the thermocouple D is connected to the terminals of a galvanometer G including a deflecting arm $G^1$ carrying a control element H at its free end and also carrying a pointer $G^2$ cooperating with the scale $G^3$ to indicate the thermocouple temperature. In the arrangement shown in Fig. 1 the controlling element H is a sheet metal vane which operates as an induction shield to regulate the mutual inductance of juxtaposed inductance coils I and $i$ as is hereinafter more fully explained.

As shown in Fig. 1, the tube A is of the type and form known as a rectifier-beam power amplifier tube 117N7—GT. The tetrode valve $a$ in the tube A comprises a cathode 3 and associated beam plates $3a$, a control grid 4, a screen grid 5, an anode or plate 6, and a filament 7 for heating both the cathode 3 of the valve $a$ and the cathode 8 of the diode valve $a'$. The diode plate 9, one terminal of the filament 7 and the cathode 3 are each connected to an energizing conductor 10 which is a branch of the supply conductor 1, and is connected to ground through a condenser 11. The second terminal of the filament 7 is connected to the supply conductor 2 by a conductor 12. The cathode 8 of the diode is connected by a conductor 13 to one terminal 14 of a condenser 15. The tetrode plate 6 is connected to the condenser terminal 14 through an inductance 16. The second terminal of the condenser 15 is connected to one terminal of a solenoid winding 18 which forms the energizing element of the control device B. The second terminal of the winding 18 is connected by a conductor 19 to the supply conductor 2.

The value of condenser 15 is so chosen in relation to the inductance of the solenoid winding 18 that the condenser 15 and solenoid 18 form a series resonant circuit. With this value for condenser 15 the voltage drop across the solenoid winding 18 is of approximately the same magnitude as the voltage of the supply conductors 1 and 2, as is also the voltage drop across the condenser 15 and also across the tube A. Such choice of the value of condenser 15, therefore, is advantageous in that it permits full line voltage to be impressed on the solenoid winding 18.

The tetrode plate 6 is connected by a conductor 20 and a condenser 21 to one terminal of the inductance or control coil I. The second terminal of the coil I is connected to a ground connection 22 to which is also connected one terminal of the second inductance or control coil $i$. The second terminal of the last mentioned coil is connected by a condenser 23 and conductor 24 to the tetrode control grid 4, and the latter is connected to the cathode 3 by a resistance 24'. The terminal 14 of the condenser 15 is connected through a conductor 25 to the screen grid 5 and to a condenser 26 which connects the conductor 25 to the conductor 10 and thereby to the supply conductor 1. As shown, a resistance 27 is connected in shunt to the inductance coil 16, the outer terminals of coils I and $i$ are connected by a resistance 28, and a condenser 29 connects conductor 25 to ground.

The control device B may be and, as diagrammatically shown, is a mercury switch of well known commercial type comprising a vertical glass envelope 30 coaxial with and surrounded by the solenoid coil 18 and partially filled by a body of mercury 31, on which a tubular core 32 of magnetic metal floats when the solenoid 18 is deenergized. When the latter is energized, the core 32 is pulled downward into the mercury body and the top surface of the latter is raised so that it then forms a bridge connection between switch terminals 33 and 34 extending through the envelope 30 and from the latter to the regulator E. Within the envelope 30, the ends of the terminals 33 and 34 are received in the lower portions of chambers open at their upper ends, and separated by a partition 30'. The upper end of said partition is submerged in the mercury when the core 32 is pulled down but extends above the mercury when the core is floating freely as shown in Fig. 1. The regulator E may be an electromagnetic switch of known type, and operates when the switch terminals 33 and 34 are connected by the mercury 31 to connect the ends or terminals of the heating resistor F to the supply conductors 1' and 2'.

In the form of the invention shown in Fig. 1, the actuating coil 18 of the control device or relay B constitutes a control circuit load which is connected between the supply conductors 1 and 2 in series with the condenser 15 and with each of the two electronic valves which are in parallel with one another. Since the plate 6 of the multigrid valve $a$ and the cathode 8 of the diode valve $a'$ are connected to the same side of the condenser 15, the diode plate current flows from the cathode 8 to the condenser terminal 14 during half cycle intervals which alternate with half cycle intervals during which the grid valve plate current flows from the condenser terminal 14 to the plate 6. By reason of the potential of the condenser 15, built up by the conduction of the grid or power tube valve $a$ during its half cycle of line power operation, the conduction of the rectifier or diode valve is controllable. Thus the load element 18 receives full wave current which is controlled by controlling the conduction of the multi-grid valve section of the system, although the latter operates only during a portion of the full wave current cycle.

With the arrangement shown in Fig. 1, it is thus possible to control the full wave current flow through the load coil 18 by regulating the conduction of the grid valve section of the system. That regulation may be effected in various ways. As shown diagrammatically in Fig. 1, the conduction of the grid valve section is regulated by varying the position of the vane H relative to the inductance coils I and $i$, and thereby so varying the mutual inductance of the coils that the grid valve $a$ will oscillate when the thermocouple temperature D is at, or above, the desired value, and will not oscillate when the thermocouple temperature is lower.

When the thermocouple temperature is high enough to result in grid valve oscillation, the current flow through each valve is small and the resultant current flow through the load coil 18 is too small to prevent the plunger 32 from floating on the mercury 31 so that the latter does not then connect the switch terminals 33 and 34. In consequence, the regulator E then interrupts the current flow from the current conductors 1' and 2' through the resistor F. When the temperature of the thermocouple D is below the desired value, the galvanometer G moves the vane H into position to so reduce the mutual inductance of the coils I and $i$ that the valve $a$ ceases to oscillate.

When this occurs the current flow through the grid valve section of the system becomes relatively high as does the current flow through the diode valve of the system. In consequence, the current flow through the load coil 18 is then sufficient to maintain the plunger 32 in its depressed position so that the mercury body 31 connects the switch terminals 33 and 34 and the regulator E is actuated to connect the furnace heating resistor F to the supply conductors 1' and 2'.

The inductance of the coil 18 is advantageously so related to the capacitance of the condenser 15 as to tune the circuit including them and thus further raise the voltage of the condenser 15. The full wave current flow through the coil 18 provides about twice as much energy for the actuation of the relay device B as would be available if the diode valve a' did not supply current during the half cycle period in which the current flow through the multi-grid valve is interrupted.

The control system shown in Fig. 1 is thus characterized by its inherent capacity for supplying sufficient power for the operation of a relatively rugged and powerful relay switch or other control device B. While other means for regulating the condition of the multi-grid valve section of the system may be used, the means shown in Fig. 1 are especially advantageous because of the inherent simplicity, reliability and sensitivity of operation of the inductance coils I and i and inductance shield vane H when they are suitably formed and disposed. A practically desirable arrangement of said coils and vane is illustrated in Figs. 2, 3 and 4 herein.

Figure 3:
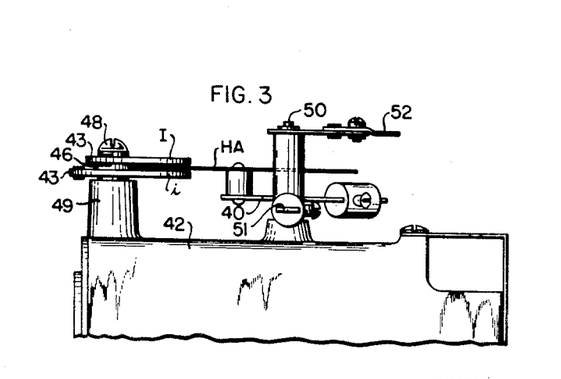
Fig. 3 is an inverted plan view of control apparatus including the element shown in Fig. 2.
Figure 4:
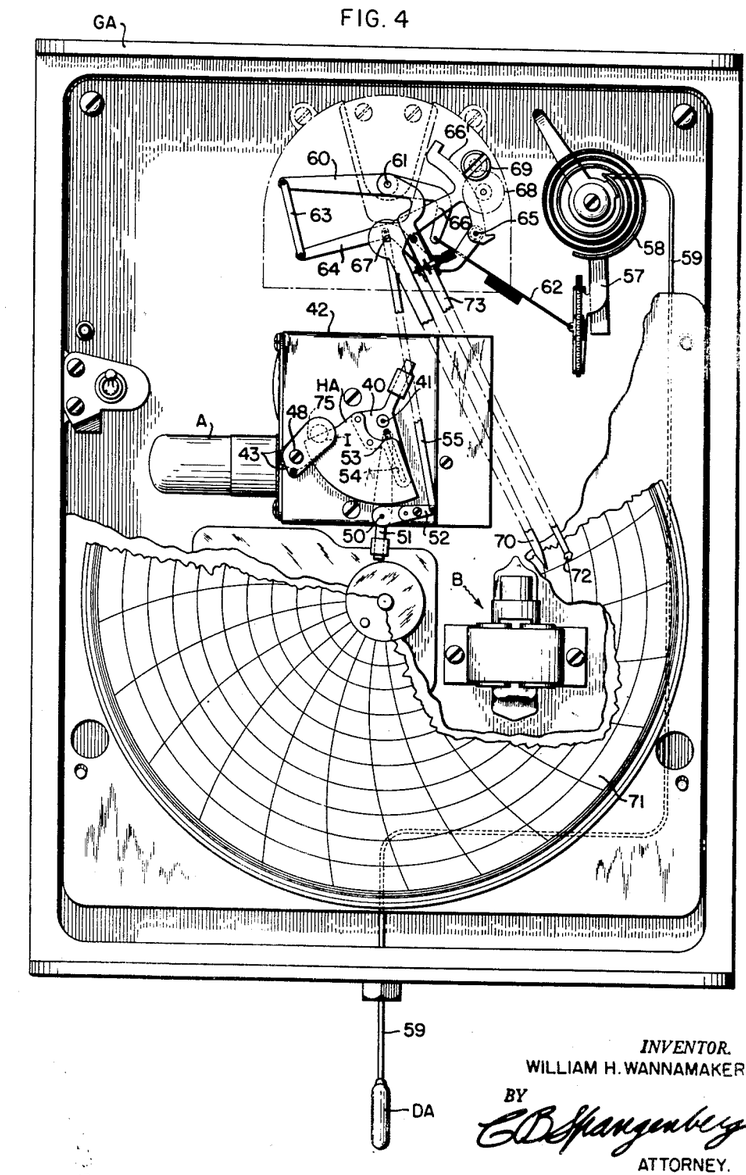
Fig. 4 is an elevation with part broken away of a control instrument, including the apparatus shown in Figs. 2 and 3.

The instrument GA shown by way of example in Fig. 4 includes a vane HA which differs in form but not in principle of operation from the vane H. The vane HA is an arc shaped body of sheet metal of good conductivity, such as aluminum, copper or brass attached to a rotatable support 40. The latter is mounted on a horizontal pivot 41 carried by the mechanism casing 42 and is suitably counter-weighted to free the vane from gravitational bias. The inductance coils I and i are flat spirals each mounted on an individual support 43. In the practically desirable form illustrated, the two supports 43 are counterparts, each being a plate-like body of insulating material formed at one side with a circular boss or projection 44 about which the conductor forming the corresponding coil I or i is spirally wound. The terminal portions 45 of said conductor extend through and are anchored by cement in holes formed in the support 43, and in practice, the body of each of the coils I and i is anchored to the corresponding support 43 by cement. The two coil supports 43 are advantageously connected to form a single mechanical unit by a metallic eyelet or hub part 46 which extends through a portion of each support displaced from its boss 44. As shown in Figs. 3 and 4, the unit including the coils I and i and their supports 43 is detachably secured by a clamping screw 48 to the end of a post portion 49 of the casing 42.

Figure 2:
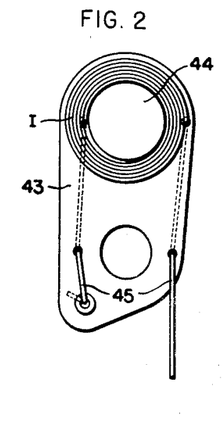
Fig. 2 is an elevation of a control element.

The inductance coil construction just described is mechanically simple and relatively inexpensive and is especially desirable because it permits the coils I and i to be accurately spaced desirably close to one another, so that a very small angular movement of the sheet metal vane HA in the inner kerf-like space between the two coils may produce a relatively large change in the mutual inductance of the coils, while permitting each of the latter to comprise but a few turns or convolutions as shown in Fig. 2. However, the special coil arrangement shown in Figs. 2, 3 and 4 is not essential to the use of the present invention, and is not claimed herein, but is claimed in my application Serial No. 541,575 filed of even date herewith.

In the instrument shown in Fig. 4, the vane HA is oscillated about the pivot 41 through a pin and slot connection between the vane support 40 and a rocker or lever element mounted on a pivot pin 50 and comprising two lever arms 51 and 52. The arm 51 carries a pin 53 received in an elongated slot 54 formed in the vane support 40 and extending in a general radial direction away from the pivot 41. The second arm 52 of the rocker element is pivotally connected to one end of an actuating link 55 which has its second end connected through a lever and link arrangement of known type to an arm 57 oscillating in accordance with changes in the value of the controlling condition. As shown in Fig. 4, the arm 57 is connected to the free end of a Bourdon tube 58 which has its other end anchored to the instrument casing and connected to one end of a capillary tube 59 through which a variable controlling fluid pressure is transmitted to the Bourdon tube 58. In consequence, the arm 57 oscillates about the axis of the Bourdon tube in the clockwise or counter-clockwise direction, as the pressure transmitted by the capillary 59 respectively decreases or increases.

The known type of link and lever arrangement through which the link 55 is adjusted longitudinally in accordance with angular adjustments of the arm 57, comprises a lever element 60 journaled on a pivot 61 carried by the instrument casing and having one arm connected by a link 62 to the arm 57. A second arm of the lever 60 is connected by a link 63 to one end of a floating lever 64. The other end of the floating lever 64 is pivotally connected by a pivot 65 to a control point adjusting element 66. The latter is pivotally mounted on a pivot pin 67 carried by the instrument casing. The element 66 may be angularly adjusted about the pivot 67 by means including a spur gear 68 in mesh with a spur gear portion 66' of the member 66. The spur gear 68 may be rotated by gearing including an adjusting shaft 69 journalled on the instrument casing, and shown as formed with a kerf in one end for screw drive adjustment. The end of the link 55 remote from the rocker arm 52 is pivotally connected to the floating lever 64 intermediate the ends of the latter. The member 66 includes an index arm 70 which indicates on the rotating instrument chart 71 the control point or value which the instrument is intended to maintain approximately constant. The actual value of that control condition is indicated and recorded on the chart 71 by a pen 72 carried at the free end of a pen arm 73 mechanically connected to the lever 60 so as to turn about the pivot 61 in accordance with changes in the value of the pressure transmitted by the capillary 59.

The Bourdon spiral 58 may be connected through the capillary tube 59 to any controlling fluid pressure source. Thus, for example, that source may be a fluid pressure thermometer bulb DA as shown in Fig. 4, and in such case the instrument GA may be employed in the control system shown diagrammatically in Fig. 1 to give the vane HA oscillatory movements relative to the coils I and i on changes in the temperature of the bulb DA which are similar to the relative movements of the vane H and coils produced in the particular arrangement shown in Fig. 1 by the response of the galvanometer G to variations in the voltage of the thermocouple D. Regardless of the origin of the controlling pressure, its decrease or increase effects a turning movement of the vane HA clockwise or counterclockwise respectively about its pivot 41.

The exact angular position of the vane HA at which the valve will cease to oscillate depends on various control system constants. Ordinarily, however, it will be a position in which the vane edge 75 extends between the bosses 44 of the two coil supports 43 approximately as shown in Fig. 4. As explained in my above mentioned copending application 541,575, control apparatus comprising an electronic valve adapted to be adjusted into or out of an oscillating condition by changes in the relative positions of an inductance shield vane HA and inductance coils I and i of the type and form shown in Figs. 2, 3 and 4, may be so constructed and arranged that the valve a will be caused to oscillate or to cease from oscillation by a movement of the portion of the vane edge 75 adjacent the axes of the coils I and i, of the order of one-thousandths of an inch.

With the pin and slot connection between the rocker arm 51 and the vane HA shown in Fig. 4, the ratio of the angular movement of the vane and rocker arm is relatively very large when the pin 53 is close to the pivot 41 and to the plane including the axes of the pivots 41 and 51, and said ratio diminishes as the pin moves away from said plane. Advantage of the pin and slot connection characteristic just mentioned, may be taken to make the instrument especially sensitive in the range of vane movement in which such sensitivity is especially important. Usually maximum sensitivity is especially desirable when the vane is in and near the position at which oscillation begins and stops. No claim is made herein on said pin and slot arrangement, as that arrangement was invented by Edwin C. Burdick, and is claimed in his application Ser. No. 541,510, now Patent Number 2,481,820.

The general principles of the present invention may be utilized with advantage in various control systems differing in form and character from that shown in Fig. 1, and some of which are illustrated by way of example in Figs. 5–10. The control system shown in Fig. 5 differs from that shown in Fig. 1 in that it includes a control device which is a reversibly rotatable electric motor BA actuated on a variation in the control condition in selective accordance with the direction of said variation. The control system shown in Fig. 5 comprises inductance or control coils carried by supports 43 and an inductance shield vane HB coacting generally as do the coils I and i and vane H of Fig. 1, but in Fig. 5, a rotative movement of the motor BA initiated by a change in the position of the vane HB relative to the associated inductance coils, effects a follow-up adjustment tending to eliminate said change. The motor BA thus tends to maintain the vane HB in approximately the same position relative to the control coils, when the controlling condition is steady for all normal values of that condition.

Figure 5:
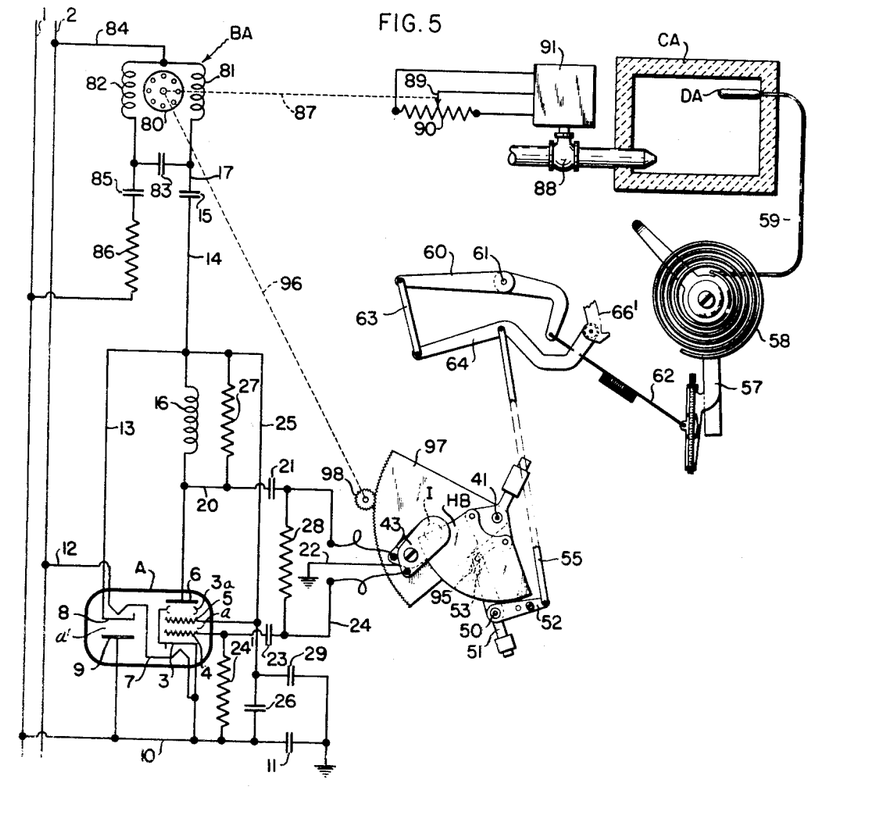
Fig. 5 is a diagram illustrating a modification of the control system shown in Fig. 1.

As diagrammatically shown in Fig. 5, the motor BA comprises a squirrel cage rotor 80 and two field windings 81 and 82. The latter cause the rotor 80 to rotate in one direction when the current in the winding 81 exceeds the current in the winding 82, and to rotate in the reverse direction when the current in the winding 81 is less than the current in the winding 82. As shown, the motor winding 81 has one terminal connected to the terminal 17 of a condenser 16 which has its other terminal 14 connected to a control circuit arrangement which may be and, as shown is identical with that to which the condenser terminal 14 is connected in Fig. 1. One terminal of the winding 82 is connected to the condenser terminal 17 through a condenser 83. The second terminals of the windings 81 and 82 are each connected by a conductor 84 to the supply conductor 2. The terminal of the winding 82 connected to the condenser 83 is also connected through a condenser 85 and a resistance 86 to the supply conductor 1.

The rotation of the rotor 80 operates through a connecting element, diagrammatically indicated as a shaft 87 to control the adjustment of the valve 88 of a furnace CA which is heated by the combustion of fuel passing through the valve 88. The connecting element 87 operates directly, on the rotation of the rotor 80, to adjust a contact 89 along a slide wire resistance 90. The latter is included in the bridge circuit of a regulating mechanism of the well known type comprising an electric motor 91 shown as directly operating the spindle of the control valve 88. An adjustment of the contact 89 along the resistance 90 unbalances said bridge circuit and thereby effects an operation of the motor 91 which then adjusts the valve 88 proportional to the adjustment given the contact 89. Through well known means (not shown), the operation of the motor 91 effects an adjustment of the bridge circuit including the resistance 90, which rebalances that bridge and thereby interrupts the operation of the motor 91.

The motor BA is started into operation as a result of changes in the temperature of the previously mentioned thermometer bulb DA located in the furnace CA and transmitting a fluid pressure through the capillary 59 to a Bourdon tube 58 like the Bourdon spiral shown in Fig. 4. The oscillatory movements given the arm 57 of Fig. 5, as a result of changes in the temperature of the furnace CA, give longitudinal adjustments to the link member 55 of Fig. 5 through a lever and link mechanism which may be identical with that shown in Fig. 4. The longitudinal adjustments of the link 55 of Fig. 5 give oscillating adjustments to a rocker element which is mounted on a pivot 50 and comprises arms 51 and 52, and may be exactly like the corresponding rocker element of Fig. 4.

The rocker arm 51 of Fig. 5 is employed to give oscillating movements to the vane element HB which is directly mounted on a pivot pin 41, and which is formed with an elongated slot 95 directly receiving the pin 53 carried by the arm 51. The slot 95 might be shaped to maintain the same relation between the angular positions of the arm 51 and the inductance shield vane as is maintained in Fig. 4. As shown, however, the slot 95 of Fig. 5 is so shaped relative to the arc of movement of the pin 53, that a given angular movement of the arm 51 will give an angular movement of the vane HB which is substantially smaller when the vane is in and near its normal load position than when the vane is remote from that position. This tends to eliminate or desirably minimize the tendency of the apparatus to hunt under certain conditions of operation. While for the purpose of the present invention, the particular shape of the slot 95 is not essential, it is nevertheless an advantageous feature of the invention, that by simple changes in the form of the vane slot 95, the relative angular movements of the arm 51 and the vane HB may be varied as required to insure the best operating results under any given set of operating conditions.

In a control system of the general type shown in Fig. 5 in which the adjustment position of the fuel valve 88 or other ultimate regulator element is dependent on the value of the controlling temperature or other controlling condition, it is desirable that each change in the adjustment position of the vane HB should result in a corresponding follow-up readjustment of the vane and inductance coils. Such a follow-up adjustment is effected in the arrangement diagrammatically shown in Fig. 5, through an element 96 shown as a shaft rotated by the rotor 80. As will be apparent, the element 96 and the link 55 may be operatively connected to the vane HB through a differential mechanism so that each adjustment of the vane effected by the link 55 will be subsequently neutralized in large part by a follow-up adjustment effected by the element 96 and in such case the inductance coil supports 43 might be stationary. As diagrammatically shown in Fig. 5, however, the supports 43 are mounted on a member 97 journalled on the pivot pin 41 and comprising a spur gear segment coaxial with the pivot 41 and in mesh with a spur gear 98 rotated by the element 96 in accordance with the rotation of the rotor 80 of the motor BA.

The general operation of the control apparatus shown diagrammatically in Fig. 5 will be readily apparent from the foregoing. In a normal, steady furnace load condition of operation, the adjustment of the valve 88 is such that the valve supplies fuel to the furnace CA at the rate required to carry the furnace load without increasing or decreasing the furnace temperature. In this condition, the vane HB occupies an angular position proportional to the adjustment position of the valve 88, and the position of the coils I and $i$ relative to the vane HB is such that the opposing torques imposed on the rotor 80 of the motor BA by the windings 81 and 82 are equal and opposite, and rotor 80 is then stationary.

On an increase in the temperature of the thermometer bulb DA, the vane HB is adjusted in the counter-clockwise direction thereby increasing the mutual inductance of the control coils mounted on the supports 43 and reducing the current flowing in the motor winding 81. This results in motor operation in the direction to give a closing adjustment to the fuel valve 88. The movement of the vane HB and valve 88 initiated by an increase in temperature continues until the furnace temperature ceases to increase, or until the control mechanism reaches the limit of its adjustment in the direction to increase the furnace fuel supply. The valve adjusting rotation of the rotor 80 also gives a follow-up adjustment movement to the support 97 on which the inductance coils are mounted, which tends to restore the normal positional relation of the inductance coils I and $i$ and vane HB, and does restore that relation when the counter-clockwise movement of the vane is interrupted. As those skilled in the art understand, regulating mechanism including follow-up means customarily includes means for interrupting the follow-up adjustment effected when the ultimate control device, which in Fig. 5 is the valve 88, reaches its wide-open or its full closed position. As such means are well known and are not claimed as novel herein, they need not be illustrated or described herein.

Control operations which are the converse of those just described follow an increase in the furnace temperature and the resultant adjustment of the vane HB in the clockwise direction. In normal operation on any change in the controlling temperature, the motor BA is operated to adjust the valve 88 into the position in which it supplies fuel to the furnace at the rate required to maintain the desired constant furnace temperature. Advantageously and as shown in Fig. 5, the normal relative position of the vane HB and associated control coils in which the motor BA is stalled is one in which a slight movement in the counter-clockwise direction of the vane relative to the coils will initiate oscillation of the valve $a$, and in which a small relative movement of the vane and coils in the opposite direction will appreciably increase the current flow through the valve. It is not essential to the operativeness of the apparatus shown in Fig. 5, that the normal or neutral position of the vane relative to the control coils should be such that a slight change in said relative position in one direction will initiate or interrupt the oscillation of the tube. In general it is desirable, however, that the apparatus be so calibrated or arranged that a slight relative movement of the vane and coils out of the normal relative position will either initiate or interrupt oscillation. In such case if the initial relative adjustment in response to a change in the controlling condition is not in the direction to initiate or interrupt the oscillation of the valve such a change in the oscillatory condition of the valve will necessarily result from the subsequent follow-up adjustment if the latter is greater than is required. The change in the oscillatory condition of the valve which may thus result either from a small change in the controlling condition, or from a small excess in the subsequent follow-up adjustment contributes materially to the reliability and effectiveness of the control obtainable with the apparatus illustrated in Fig. 5.

Figure 6:
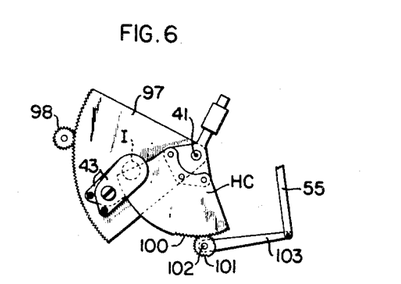
Fig. 6 is an elevation illustrating a modification of an apparatus feature shown in Fig. 5.

In Fig. 6, I have illustrated a modification in which the vane HC is provided with a toothed edge 100 extending circularly about the pivot 41 and in mesh with a spur gear 101 journalled on a pivot 102. The gear 101 is connected to an arm 103 pivotally connected to the adjustment end of the link 55. Thus the longitudinal adjustment of the link 55 gives a rotative movement to the gear 101 and thereby to the vane HC.

Figure 7:
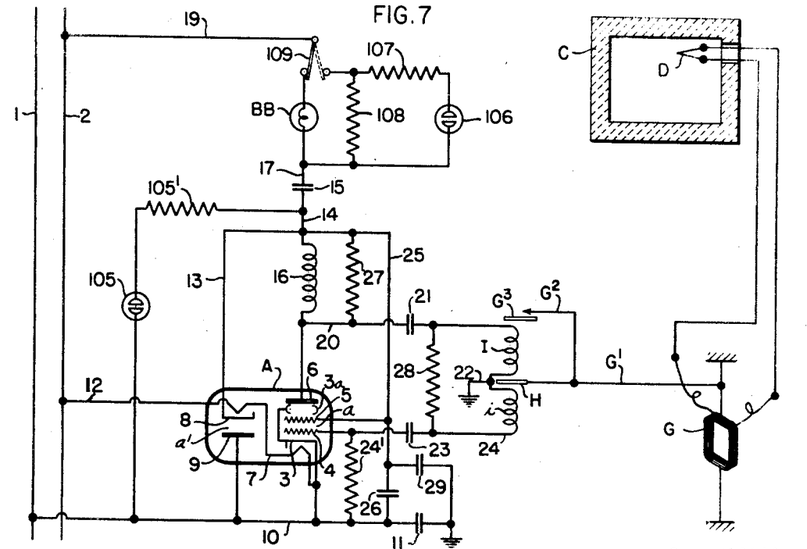
Figs. 7, 8 and 9 are diagrams illustrating control systems differing from one another and from each of the control systems shown in Figs. 1 and 5.

In the form of the invention illustrated in Fig. 7, the portion of the control circuit between the junction of the conductor 13 with terminal 14 and the supply conductor 1, may be identical with the corresponding portion of the control systems shown in Figs. 1 and 5. Fig. 7 differs from Fig. 1, however, in that the load coil 18 of Fig. 1 is replaced in Fig. 7 by a signal lamp BB, which may be a filament lamp, for instance a 6 watt lamp, or may be a neon lamp of similar wattage. In Fig. 7, a neon lamp 105, or other low current drain type signal lamp, and a resistance 105' are series connected in shunt to the tube A between the condenser 15 and the conductor 10.

In the contemplated operation of the system shown in Fig. 7, when the position of the controlling vane H permits the mutual inductance of the control coils I and $i$ to be high, the current flow through the lamp BB is insufficient to operatively energize that lamp. In such case, however, the potential difference between the condenser 15 and the supply conductor 1 will be high enough to energize the neon lamp 105. When the vane H is adjusted to reduce the mutual inductance of the coils I and $i$, or the grid valve conduction is otherwise increased so that the current flow through the signal lamp BB is sufficient to illuminate the latter, the potential difference between the supply conductor 1 and the condenser 15 becomes too small to illuminate the neon lamp 105. The described arrangement shown in Fig. 7 thus gives high-low current signal lamp indications without requiring the use of the special relays ordinarily required heretofore. In lieu of, or in addition to the lamp BB, a neon lamp 106 may be connected in shunt to a resistance in the load circuit between the condenser 15 and the line conductor 2. As shown, the neon lamp 106 is connected in series with a resistance 107 and in shunt to a resistance 108 which may be connected into the load circuit in lieu of the lamp BB by the adjustment of a switch 109.

Figure 8:
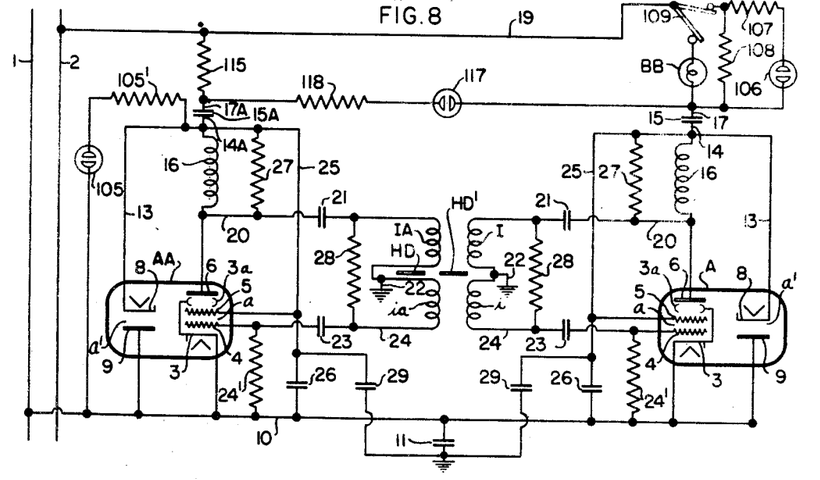

In Fig. 8 I have illustrated a three position signal form of my invention including a lamp 105 illuminated when the furnace temperature or other controlling condition has an intermediate value; a lamp BB or 106 illuminated when the value of the controlling condition is high, and a third lamp 117 illuminated when the value of the controlling condition is low. To thus control the high, intermediate and low value signal lamps as described, I combine the control system parts common to Figs. 1 and 7 with a duplicate set of such control system parts. In Fig. 8 the second set control parts corresponding to the first parts A, 15, 17, I and $i$ are designated AA, 15A, 17A, IA and $ia$, respectively.

The control system shown in Fig. 8 includes a single controlling vane which, however, is bifurcated or divided into right and left portions HD' and HD, respectively. The two vane portions are so disposed that when the furnace temperature or other controlling condition is in an intermediate portion of its value range, the vane HD' is between and out of inductive relation with both sets of control coils and the vane portion HD is at the left of, and out of inductive relation with the coils IA and $ia$. In consequence, the multi-grid valve $a$ of each of the tubes A and AA is then in its oscillating condition. When the controlling vane deflects to the right or high position on an increase in the value of the controlling condition, the vane portion HD' is interposed between the coils I and $i$ and the vane portion HD is interposed between the coils IA and $ia$, and the valve $a$ of each of the tubes A and AA is in its non-oscillating condition. When the controlling vane is deflected to the left as a result of the low value of the controlling condition, the vane portion HD' is interposed between the coils IA and $ia$ with the result that the valve $a$ of the tube AA is then prevented from oscillating, while the valve $a$ of the tube A is permitted to oscillate.

The filament lamp BB or alternatively, a neon type lamp 106 is connected between the branch 19 of the supply conductor 2 and the terminal 17 of the condenser 15 in Fig. 8 as in Fig. 7. A resistance 115 is connected between the branch 19 of supply conductor 2 and the terminal 17A of the condenser 15A associated with the tube AA. The neon tube lamp 105 and its associated resistance 105' are connected in shunt to the tube AA between the branch 10 of the supply conductor 1 and the connected terminals of the inductance 16 and condenser 15A. The signal lamp 117 and an associated resistance 118 are connected between the condenser terminals 17 and 17A.

In the contemplated operation of the control system shown in Fig. 8, when the controlling vane is in its intermediate or neutral position as shown, and the valves $a$ of the tubes A and AA are both in oscillation, the lamp BB or 106 will not be illuminated because of the relatively small current flow through the oscillating valve $a$ of the tube A, and the lamp 105 will be illuminated because of the relatively high potential of the condenser terminal 14A resulting from the fact that the valve $a$ of the tube AA is oscillating. When the controlling vane is adjusted to its right, or high, position and interrupts the oscillation of each valve $a$, the increased current flow through the tube A will illuminate the lamp BB, or 106, and the decreased voltage of the condenser terminal 14A will prevent the lamp 105 from being illuminated. When the controlling vane is turned into its left, or low, position in which the controlling vane part HD' prevents the valve $a$ of the tube AA from oscillating but does not interfere with the oscillation of the valve $a$ of the tube A, the potential of the terminal 17 exceeds that of the terminal 17A and creates a current flow through the lamp 117, illuminating the latter.

Figure 9:
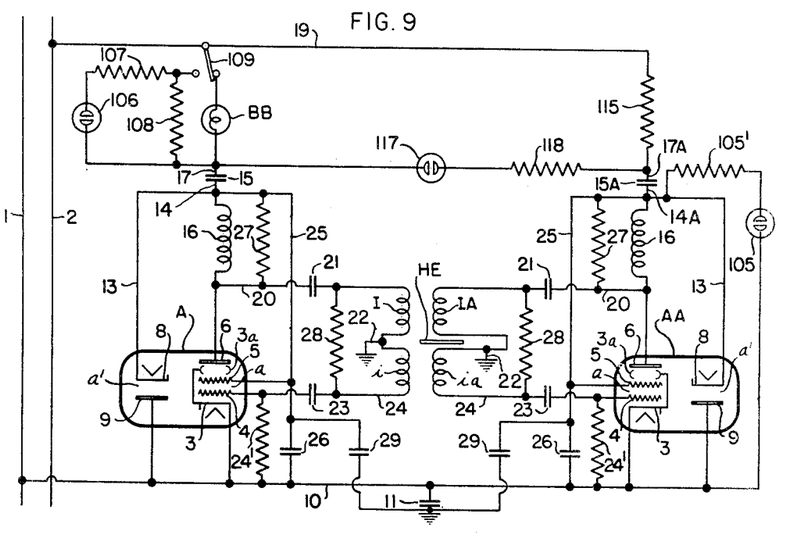

In Fig. 9, I have illustrated a modification of the signal system shown in Fig. 8 in respect to the interaction of the controlling vane and control coils. The circuit arrangement employed in Fig. 9 may be, and as shown is, identical in substance with that shown in Fig. 8, although in Fig. 9, the tube AA is at the right of the tube A, and the low position of the controlling vane is at the right of its high position. In Fig. 9, however, the bifurcated vane of Fig. 8 is replaced by a single relatively narrow vane HE shown in its neutral position. In its low position, the vane HE is displaced to the right of all of the control coils and does not significantly reduce the mutual inductance of the pair of coils IA and $ia$, or of the pair of coils I and $i$. In consequence, when the vane HE is in its low position, the valves $a$ of the tubes A and AA are both in oscillation, and the signal lamp 105 then glows.

When the vane HE occupies its high, or left hand position, it so reduces the mutual inductance of each pair of control coils as to prevent each of the two valves $a$ from oscillating, and whichever of the lamps BB and 106 is then in circuit will glow. In its intermediate, or neutral position, the vane minimizes the mutual inductance of the control coils IA and $ia$ and thereby prevents the valve $a$ of the tube AA from oscillating but does not interfere with the oscillation of the valve $a$ of the tube A. In consequence, the lamp 117 of Fig. 9 is caused to glow when the vane HE is in its intermediate position.

Figure 10:
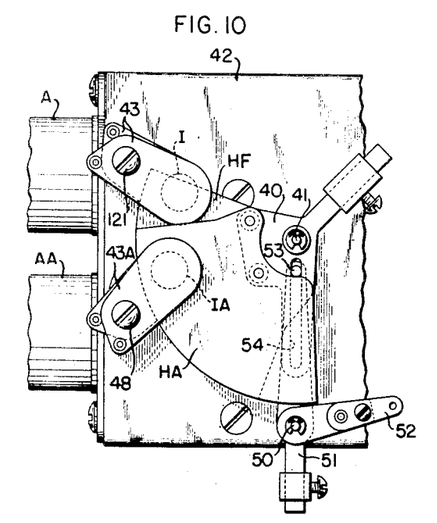
Fig. 10 is an elevation taken similarly to Fig. 4 illustrating a modification of the vane and control arrangement of Fig. 4.
Figure 11:
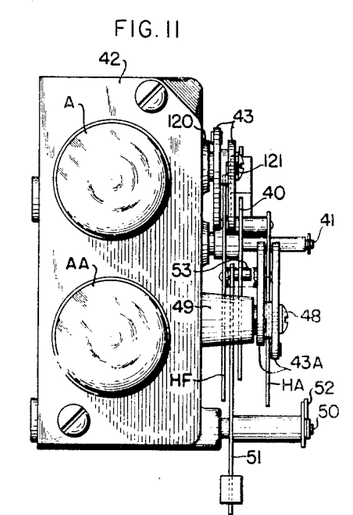
Fig. 11 is an elevation taken at right angles to Fig. 10.

With a circuit arrangement including two pairs of cooperating inductance coils operatively associated with inductance shielding vane means, in the general manner shown in Figs. 8 and 9, I consider it ordinarily advantageous from the practical standpoint, to employ a separate vane element in association with each pair of control coils. Thus, as shown in Figs. 10 and 11, I may make use of a controlling vane and control coil arrangement which includes a vane HA mounted and oscillated exactly as is the vane HA shown in Figs. 3 and 4. The oscillating member 40 supporting the vane HA of Figs. 10 and 11, is also mechanically connected to and supports and moves an inductance shield vane HF. The vanes HA and HF are parallel to one another and at the opposite sides of the supporting member 40.

As shown in Figs. 10 and 11, the angular position of the vane HA controls the mutual inductance of control coils which may be the coils IA and ia of Figs. 8 and 9, and are carried by control coil supports 43A, respectively, similar in construction and in their mounting on the mechanism casing 42, to the coils I and i, and the coil supports 43 shown in Figs. 3 and 4. In Figs 10 and 11, the vane HF controls the mutual inductance of control coils mounted on supports 43 which may be the coils I and i of Figs. 8 and 9, and are similar to the coils I and i and supports 43 of Figs. 3 and 4. The coil supports 43 of Figs. 10 and 11 are shown as secured by a clamping screw 121 to the upper end of a short post 120 carried by the mechanism casing 42 and laterally displaced from the post 49 to which the coil supports 43A are attached.

The vanes HA and HF of Figs. 10 and 11 are so shaped and disposed relative to one another and to the axes of the two pairs of control coils, that in the high position of the vane carrier 40, which is that shown in Figs. 10 and 11, the vane HF so reduces the mutual inductance of the control coils mounted on the supports 43 and the vane HA so reduces the mutual inductance of the control coils mounted on the supports 43A as to prevent oscillation of the valves a of tubes AA and A associated with those coils as the valves a of the tubes AA and A are respectively associated with the coils I and i, and IA and ia of Fig. 9.

A counterclockwise movement of the vane support 40 of Figs. 10 and 11 into the low position of said member will displace the vanes HA and HF in the counterclockwise direction from the control coils mounted on the supports 43A and 43, respectively, so that each of the two valves a respectively associated with the two pairs of control coils are free to oscillate. In an angular position of the member 40 intermediate to its high and low positions, the vane HF will be wholly displaced counterclockwise from the control coils mounted on the supports 43, but the vane HA will still be interposed between the control coils carried by the supports 43A. In consequence the valve a associated with the last mentioned coils will still be prevented from oscillating by the vane HA but the vane HF will not then interfere with the oscillation of the valve a associated with the control coils carried by the supports 43. Thus, for example, as will be apparent, the two mechanically connected vanes HA and HF shown in Figs. 10 and 11 may be used in the control system shown in Fig. 9 in lieu of the single vane HE, to cause one or another of the signal lamps 105, 117 and BB or 106 to glow accordingly as the vanes HA and HF occupy their respective low, intermediate or high positions.

The angular relation of either of the vanes HA and HF relative to the common axis of the associated pair of control coils with any given position of the vane carrying member 40 may be adjusted by the angular adjustment of the supports 43A or 43 for said pair of control coils about the corresponding clamping screw 48 or 121. As will be apparent by a 180° angular adjustment of the arm 52 relative to the arm 51, the vanes HA and HF may be given clockwise adjustments by a down movement of the free end of the arm 52.

Figure 12:
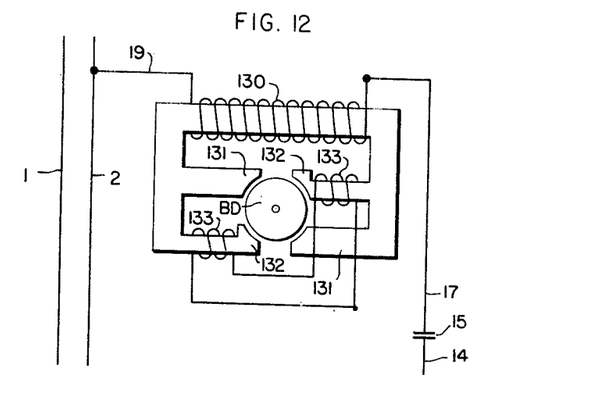
Fig. 12 is a diagram illustrating a control system including a unidirectional motor.

In Fig. 12, I have illustrated a modification of the control system shown in Fig. 1 in which the mercury switch control device B of Fig. 1 is replaced by a uni-directional motor BD. The latter as shown, is a shading pole, alternating current motor having an energizing winding 130 for its main poles 131 and having each of its shading poles 132 surrounded by a short circuited winding 133. The winding 130 is connected between the condenser terminal 17 and the supply conductor 2.

In the contemplated operation of the control system shown in Fig. 1, the motor BD runs continuously in one direction during periods in which the mutual inductance of the control coils I and i is not high enough to cause the valve a of the tube A to oscillate, and is stationary during periods in which said valve a oscillates. The motor 130 is thus well adapted for integrating and other purposes in which use may be made of a motor operating intermittently in one direction during periods varying in frequency and duration in accordance with variations in a controlling condition. For example, such a motor may be employed to drive a counting train and thereby provide a measure of the aggregate duration of the periods during which the controlling vane H prevents the valve a of Fig. 1 from oscillating.

Figure 13:
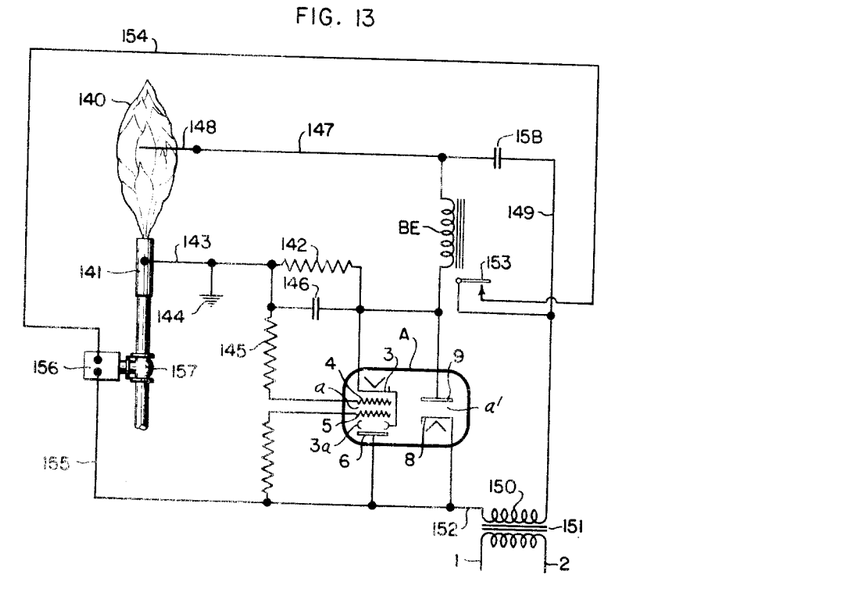
Fig. 13 is a diagram illustrating a control system actuated in response to flame variations.

In Fig. 13, I have illustrated a safety control system for a fuel burner comprising one embodiment of the present invention. In that embodiment, the rectifying action of the flame 140 from a gas burner 141 is employed to impress a positive potential on the control grid 4 of the valve a in a tube A when the flame 140 is in its normal condition. In consequence the current flow through the winding of a control device BE is greater when the flame is in its normal condition than when the extinction of the flame or some abnormal condition of the control system makes the control grid potential more negative.

As shown in Fig. 13, the diode plate 9 and the cathode 3 of the multi-grid valve a in the tube A are connected to one terminal of the control winding BE and are connected through a resistance 142 and a conductor 143 to the body of the burner 141 and to a ground connection 144. The grounded burner body 141 is connected through the conductor 143 and a resistance 145 to the control grid 4 of the valve a. A condenser 146 is connected in shunt to the resistance 142. The control winding BE connects the plate 9 and cathode 3 to one terminal of a condenser 15B and in conjunction with a conductor 147 it connects said plate and cathode to an electrode 148. The electrode 148 extends into the tip portion of the flame 140 when the condition of the latter is normal. The condenser 15B connects the control winding BE to the terminal 149 of the secondary winding 150 of an energizing transformer 151. The second terminal 152 of the winding 150 is connected to the cathode 8 of the diode a' and to the plate 6 of the grid valve a.

As is known to those skilled in the art, with the electrode 148 extending into the tip of the flame 140 as it does in the normal condition of the flame, the latter provides a path for current flow between the terminals formed by the electrode 148 and the burner body 141, which is more highly conductive for current flow in the direction opposite to that of flame propagation, i. e., in the direction from the electrode 148 to the burner 141, than for current flow in the opposite direction. This rectifying action is explained by the fact that the combustion reaction maintaining the flame is attended by, or results in, ionization and a concentration of positive ions adjacent to the burner body and a concentration of negative ions or electrons at the tip portion of the flame.

The charging current flow from the diode plate element 9 during each of alternate half cycles acts through the rectifier formed by the flame 140, electrode 148 and burner body 141, to maintain a potential on the control grid 4 which is more positive than that of the cathode 3 during each subsequent half cycle in which the plate 6 of the grid valve a is positive. The grid valve then discharges the condenser 15B through the winding BE and thereby effectively energizes the latter. The winding BE is effectively deenergized by the extinction of the flame, and also by the development of an abnormal condition which has the effect of connecting the electrode 148 to ground directly or through an ohmic impedance substantially smaller than the impedance due the flame when the latter is in normal condition. In either case, the potential of the control grid 4 is more negative than it is when said grid is electrically connected to the condenser 15B through the flame. As diagrammatically shown in Fig. 13, the winding BE is the energizing winding of an A. C. relay having an armature 153. When the winding BE is deenergized, the armature 153 connects a conductor 154 to the conductor 149, and thereby completes a circuit including a conductor 154 and the transformer secondary 150. The completion of that circuit automatically closes the burner valve 157. Subject matter disclosed in this application but not specifically included herein and relating to the uni-directional motor control arrangement of Fig. 12 is disclosed and is being claimed in a divisional application bearing Serial No. 93,213, filed May 14, 1949. The control apparatus actuated in response to flame variations, shown in Fig. 13, but not specifically claimed herein is disclosed and is being claimed in a separate divisional application bearing Serial No. 92,480, filed May 10, 1949.

While, in accordance with the provisions of the statutes, I have illustrated and described the best forms of embodiment of my invention now known to me, it will be apparent to those skilled in the art that changes may be made in the forms of the apparatus disclosed without departing from the spirit of my invention as set forth in the appended claims, and that in some cases certain features of my invention may be used to advantage without a corresponding use of other features.

Having now described my invention, what I claim as new and desire to secure by Letters Patent, is:

1. In combination, a pair of terminals adapted to be connected to a source of alternating current, a control device, a condenser, two electronic valves connected to said terminals in parallel with one another and in series with said control device, condenser and terminals, one of said valves being a diode and the second valve having a control grid, an anode, a cathode and a reactive coupling between said grid and anode, each valve being connected to said terminals for current flow through the valve during half cycles alternating with those during which current flows through the other valve, and means responsive to a control condition for varying the reactance of said reactive coupling in accordance with the variations in the values of said condition and thereby causing said second valve to oscillate in response to one, but not in response to another of the values of said condition.

2. In combination, a pair of terminals adapted to be connected to alternating current supply conductors, a signal lamp, a condenser, two electronic valves connected in parallel with one another and in series with said lamp and condenser between said terminals, one of said valves being a diode and the second valve having a control grid and each being connected between one of said terminals and said condenser for current flow through each valve during half cycles alternating with those during which current flows through the other valve, a second signal lamp connected in shunt to said valves between said one terminal and condenser, and means responsive to a control condition for impressing a control voltage on said control grid varying in accordance with the variations in the values of said condition through a range including a value at which the first mentioned lamp will be illuminated and a second value at which the second mentioned lamp will be illuminated.

3. In combination, a pair of terminals adapted to be connected to alternating current supply conductors, two circuit units each including a condenser, two electronic valves connected in parallel with one another and in series with said condenser and between the latter and one of said terminals, one of said valves being a diode and the second valve having a control grid and each being connected between said one terminal and condenser for current flow through each valve during half cycles alternating with those during which current flows through the other valve, means responsive to a control condition for impressing control voltages on the two control grids which vary in dissimilar accordance with the variations in the values of said condition, a signal lamp connected between the condenser of one unit and the second terminal, an impedance connected between the condenser of the second unit and said second terminal, a second signal lamp connected between the last mentioned condenser and said one terminal in shunt to the valves of said second unit, and a third signal lamp connected between the terminals of said condensers connected to said second terminal.

4. In combination, terminals adapted to be connected to a source of alternating current, a condenser, a control device, an electronic valve including a control grid, a diode electronic valve, said valves being so connected to said terminals in parallel with one another and in series with said condenser and control device that said valves are respectively adapted to pass currents in opposite directions through said device and condenser, a signal lamp of low current drain type connected in shunt to said valves, and means for varying the potential of said control grid in accordance with variations in a controlling quantity to thereby control current flow through the first mentioned valve and by the effect of each said current flow on the potential of the condenser, to indirectly control the immediate subsequent current flow through said diode valve.

5. In combination, a pair of terminals adapted to be connected to a source of alternating current, a control device, a condenser, two electronic valves connected to said terminals in parallel with one another and in series with said control device, condenser and terminals, one of said valves being a diode and the second valve having a control grid, an anode, a cathode and a reactive coupling between said grid and anode, and each valve being connected to said terminals for current flow through the valve during half cycles alternating with those during which current flows through the other valve, means responsive to a control condition for varying the reactance of said reactive coupling in accordance with the variations in the values of said condition and thereby causing said second valve to oscillate in response to one, but not in response to another of the values of said condition and actuating said control device to effect a control action in one direction or in the opposite direction accordingly as the current flow through said valve increases above or decreases below a predetermined value at which said device is inactive, and means operated by said control device, when actuated, to effect a follow-up adjustment of said elements tending to maintain them in a predetermined relative adjustment in which said device is inactive.

6. In combination, a pair of terminals adapted to be connected to a source of alternating current, a control device, a condenser, two electronic valves connected to said terminals in parallel with one another and in series with said control device, condenser and terminals, one of said valves being a diode and the second valve having a control grid, an anode a cathode and a reactive coupling between said grid and anode comprising two adjustable elements, and each valve being connected to said terminals for current flow through the valve during half cycles alternating with those during which current flows through the other valve, means responsive to a control condition for adjusting one of said elements in selective response to changes in said condition and thereby causing said second valve to oscillate in response to one, but not in response to another of the values of said condition and actuating said control device to effect a follow-up adjustment of the other element tending to maintain the said elements in a predetermined relative adjustment in which said device is inactive.

WILLIAM H. WANNAMAKER, JR.

REFERENCES CITED

The following references are of record in the file of this patent:

UNITED STATES PATENTS

| Number | Name | Date |
|---|---|---|
| 1,838,084 | Drake | Dec. 29, 1931 |
| 2,115,027 | Leonard | Apr. 26, 1938 |
| 2,157,888 | Dawson | May 9, 1939 |
| 2,263,932 | Schnoll | Nov. 25, 1941 |
| 2,310,955 | Hornfeck | Feb. 16, 1943 |
| 2,349,963 | Harrison | May 30, 1944 |
| 2,351,760 | Beers | June 20, 1944 |
| 2,354,945 | Cohen et al. | Aug. 1, 1944 |

FOREIGN PATENTS

| Number | Country | Date |
|---|---|---|
| 750,075 | France | Aug. 3, 1933 |